(12) United States Patent
Kaajakari

(10) Patent No.: US 12,287,204 B2
(45) Date of Patent: Apr. 29, 2025

(54) DOUBLE-LEVER COUPLING

(71) Applicant: Murata Manufacturing Co., Ltd., Nagaokakyo (JP)

(72) Inventor: Ville Kaajakari, Helsinki (FI)

(73) Assignee: MURATA MANUFACTURING CO., LTD.

(*) Notice: Subject to any disclaimer, the term of this patent is extended or adjusted under 35 U.S.C. 154(b) by 261 days.

(21) Appl. No.: 17/983,647

(22) Filed: Nov. 9, 2022

(65) Prior Publication Data
US 2023/0152098 A1 May 18, 2023

(30) Foreign Application Priority Data

Nov. 10, 2021 (FI) .................................... 20216156

(51) Int. Cl.
*G01C 19/574* (2012.01)
*G01C 19/5769* (2012.01)
(52) U.S. Cl.
CPC ....... *G01C 19/574* (2013.01); *G01C 19/5769* (2013.01)
(58) Field of Classification Search
CPC .................................................. G01C 19/574
USPC ....................................................... 73/504.12
See application file for complete search history.

(56) References Cited

U.S. PATENT DOCUMENTS

2016/0370180 A1* 12/2016 Naumann .......... G01C 19/5621

FOREIGN PATENT DOCUMENTS

DE 102008064900 B3 9/2021

OTHER PUBLICATIONS

Su, X.-P.S. et al.; "Design of compliant microleverage mechanisms"; Sensors and Actuators A: Physical, vol. 87, Issue 3, Jan. 2001, pp. 146-156.
Ziming Ren et al.; "A probe-type high-precision micro-force sensor based on quartz DETF resonator"; Measurement Science and Technology, vol. 32, No. 11, Jul. 15, 2021, (12 pages).

* cited by examiner

*Primary Examiner* — Walter L Lindsay, Jr.
*Assistant Examiner* — Philip T Fadul
(74) *Attorney, Agent, or Firm* — ArentFox Schiff LLP

(57) ABSTRACT

A microelectromechanical resonator is provided with two proof masses that are coupled with an anti-phase coupling structure that includes a seesaw lever and a force-displacement lever. Moreover, a joint extends from the seesaw lever to the force-displacement lever and a mass connection element extends from each proof masse to the adjacent lever.

15 Claims, 7 Drawing Sheets

DOUBLE-LEVER COUPLING

CROSS REFERENCE TO RELATED APPLICATION

This application claims priority to Finnish Patent Application No. 20216156, filed Nov. 10, 2021, the entire contents of which are hereby incorporated by reference in its entirety.

TECHNICAL FIELD

This disclosure relates to microelectromechanical systems (MEMS) where at least two mobile proof masses move in relation each other. More particularly, this disclosure relates to coupling systems that promote anti-phase movement where the two proof masses move toward each other and then away from each other.

BACKGROUND

Micromachined MEMS devices, such as gyroscopes and accelerometers, are used widely in automotive stability control, navigation, and consumer electronics. Many MEMS devices include proof masses that are driven by force transducers to oscillate in resonant oscillation modes. Proof masses in a gyroscope should be easily driven to oscillate in a primary oscillation mode (which may also be called the drive oscillation mode) and they should also be suspended with an arrangement which allows them to easily undergo oscillation in a secondary oscillation mode (which may also be called the sense oscillation mode) induced by the Coriolis force. A general problem in gyroscope design is that the oscillation of the proof masses in these two modes should preferably not be perturbed by external disturbances, for example vibrations in surrounding elements.

A simple MEMS gyroscope may be constructed utilizing only one oscillating proof mass, but the output signal of such a gyroscope will typically be very noisy when external vibrations are present because the accelerating movement produced by the vibrations can be large enough to mask the weak Coriolis signal.

It is known that a proof mass system where two proof masses oscillate in anti-phase (i.e., in opposite directions) can be made more robust against vibrations than a one-mass gyroscope. Output signal components induced by common-mode acceleration (both masses moving in the same direction) can to some extent be automatically cancelled with a differential measurement. The output signal will then reflect the Coriolis signal more accurately.

Anti-phase oscillation can be reinforced with a coupling system which joins the two masses to each other. The coupling should preferably promote anti-phase oscillation and resist common-mode movement. Anti-phase coupling systems may for example include a spring system which is flexibly compressed when the masses move toward each other. The elastic energy stored in the spring system is released in the opposite phase of the oscillation where the two masses begin to move away from each other. However, a common disadvantage with spring coupling systems is that they raise the natural resonance frequency of the desired anti-phase oscillation mode. The common-mode movement is not affected by simple spring coupling and hence the common mode resonance may be lower in frequency than the operational anti-phase oscillation mode, which can result in noise in the output signal.

Coupling systems which utilize a rigid lever typically raise the frequency of common-mode oscillation high above that of the anti-phase oscillation mode and thereby reduce the noise which external disturbances can produce. U.S. Patent Publication No. 2016/0370180 presents an anti-phase coupling system where the opposing ends of a rotating lever are coupled to two adjacent proof masses.

A general problem with these single-lever coupling systems, as described therein, is illustrated in FIGS. 1a-1c. In particular, the lever needs to be relatively long to give the proof masses a sufficient range of movement, but the point where the first end of the lever 14 is attached to the left proof mass 11 will then lie at a distance 19 from the point where the second end of the lever 14 is attached to the right-side proof mass 12 (in the direction which is perpendicular to the direction of motion). The coupling system therefore has an unbalancing effect on the mass system which may induce unwanted rotational motion in the proof masses.

The device in U.S. Patent Publication No. 2016/0370180 utilizes two separate single-lever couplings to mitigate the unbalancing effect. However, this configuration consumes a lot of space and still does not create a symmetric force transfer between the two proof masses.

SUMMARY OF THE INVENTION

Accordingly, it is an object of the present disclosure to provide an apparatus that alleviates the above disadvantages. In an exemplary aspect, a microelectromechanical resonator is provided that includes a first proof mass and a second proof mass that lie in an xy-plane, such that the first proof mass and the second proof mass are aligned on a lateral axis extending in a lateral direction in the xy-plane, and a transversal axis extends in a transversal direction that is perpendicular to the lateral direction. The microelectromechanical resonator further includes a first lateral anti-phase coupling structure that couples the first proof mass to the second proof mass and has a first seesaw lever and a first force-displacement lever, a first joint that extends from a first joint connection point on the first seesaw lever to a second joint connection point on the first force-displacement lever, a first mass connection element that extends from the first proof mass to a first mass connection point on the first seesaw lever, and a second mass connection element that extends from the second proof mass to a second mass connection point on the first force-displacement lever. In this exemplary aspect, the first seesaw lever is suspended from a first anchor point by at least one flexible first suspender attached to the first seesaw lever at a first seesaw suspension point, and the at least one flexible first suspender configures the first seesaw lever to turn around the first seesaw suspension point in the xy-plane. Moreover, the first seesaw suspension point lies between the first joint connection point and the first mass connection point on the first seesaw lever, and the first seesaw suspension point lies closer to the first joint connection point than to the first mass connection point.

In an additional exemplary aspect of the microelectromechanical resonator, the first force-displacement lever is suspended from a second anchor point by at least one flexible second suspender attached to the first force-displacement lever at a first force-displacement suspension point, and the at least one flexible second suspender configures the first force-displacement lever to turn around the first force-displacement suspension point in the xy-plane. In a refinement of the exemplary aspect, both the second joint connection point and second mass connection point lie on a same side of the first force-displacement suspension point on the first force-displacement lever.

According to an exemplary aspects disclosed herein, an apparatus is provided that utilizes a coupling system where two levers are connected to each other. Two advantages of this arrangement are that the coupling system becomes compact and the attachment points to the two proof masses can be brought close to each other.

BRIEF DESCRIPTION OF THE DRAWINGS

In the following the disclosure will be described in greater detail by means of exemplary embodiments with reference to the accompanying drawings, in which.

DETAILED DESCRIPTION OF EXEMPLARY EMBODIMENTS

This disclosure describes a microelectromechanical resonator comprising a first proof mass and a second proof mass that lie in an xy-plane. In particular, the first proof mass and the second proof mass are at least partly aligned on a lateral axis which extends in a lateral direction in the xy-plane. A transversal axis extends in a transversal direction which is perpendicular to the lateral direction. The first proof mass is coupled to the second proof mass by a first lateral anti-phase coupling structure.

The first lateral anti-phase coupling structure comprises a first seesaw lever and a first force-displacement lever. A first joint extends from a first joint connection point on the first seesaw lever to a second joint connection point on the first force-displacement lever. A first mass connection element extends from the first proof mass to a first mass connection point on the first seesaw lever. A second mass connection element extends from the second proof mass to a second mass connection point on the first force-displacement lever.

Moreover, the first seesaw lever is suspended from a first anchor point by at least one flexible first suspender attached to the first seesaw lever at a first seesaw suspension point. The at least one flexible first suspender allows the first seesaw lever to turn around the first seesaw suspension point in the xy-plane. The first seesaw suspension point lies between the first joint connection point and the first mass connection point on the first seesaw lever.

The first force-displacement lever is suspended from a second anchor point by at least one flexible second suspender attached to the first force-displacement lever at a first force-displacement suspension point. The at least one flexible second suspender allows the first force-displacement lever to turn around the first force-displacement suspension point in the xy-plane. Both the second joint connection point and second mass connection point lie on the same side of the first force-displacement suspension point on the first force-displacement lever. Furthermore, the first seesaw suspension point lies closer to the first joint connection point than to the first mass connection point.

For purposes of this disclosure, the xy-plane is also called the device plane. The x-direction is referred to as the "lateral" direction and the y-direction as the "transversal" direction. The device plane may also be called the horizontal plane. A z-axis is perpendicular to the xy-plane, and it may also be called the "vertical" axis. Linear and/or rotational motion where a proof mass or a lever remains level in the device plane when it moves away from its rest position is referred to as "in-plane" motion or "motion in the device plane". Rotation about any axis perpendicular to the device plane may be referred to as rotation about the z-axis.

Figure 1A:
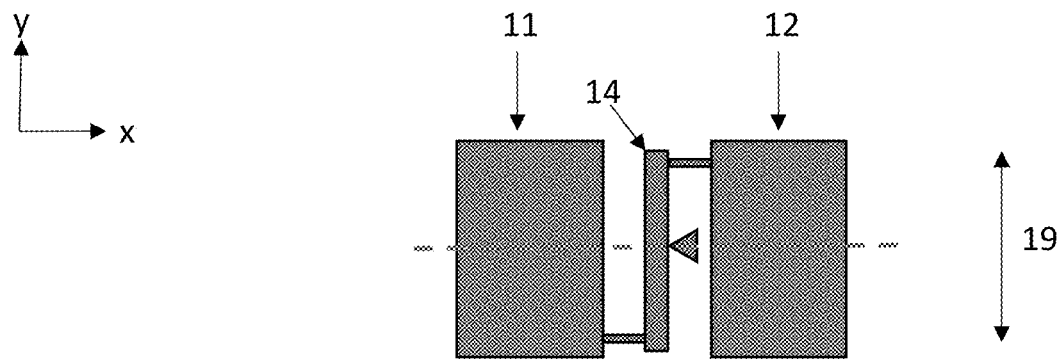
FIGS. 1a-1c illustrates a single-lever coupling system known from the prior art.
Figure 1B:
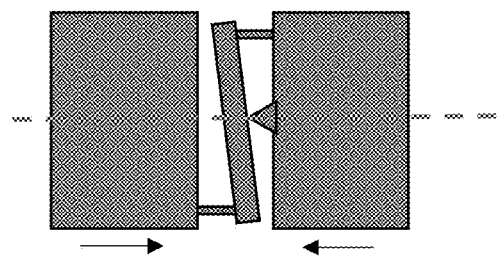
Figure 1C:
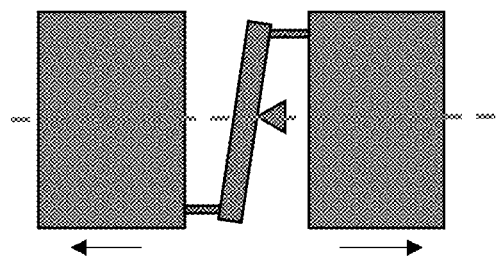
Figure 2A:
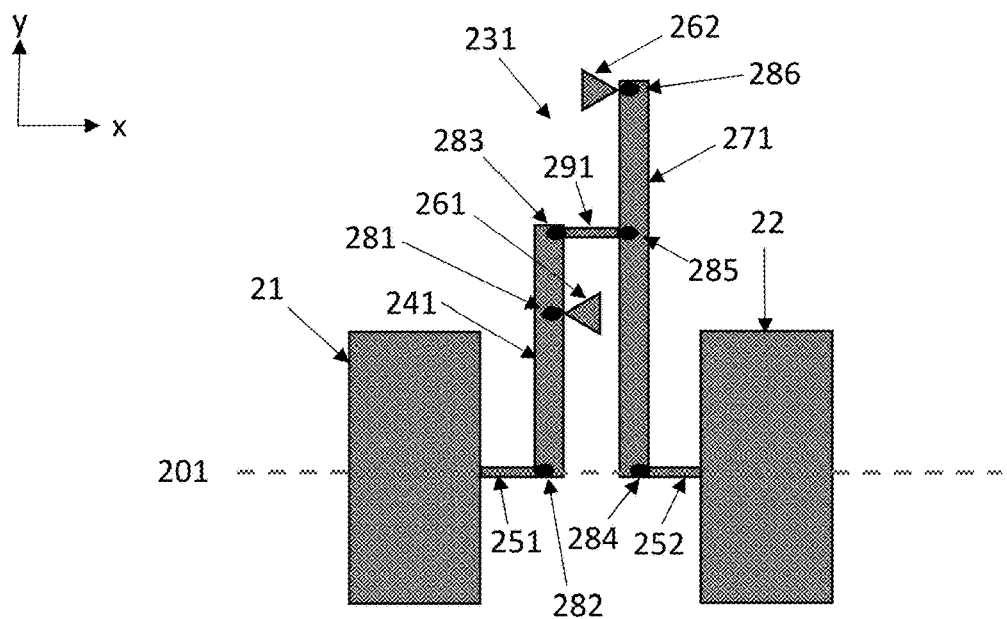
FIGS. 2a-2c illustrates an anti-phase coupling structure with two levers according to an exemplary aspect.

FIG. 2a illustrates a first proof mass 21 that is coupled to a second proof mass 22 with a lateral anti-phase coupling structure 231. The proof masses are aligned on a lateral axis 201 that extends in the direction of the x-axis. The transversal direction is indicated by the y-axis. The first and second proof masses may undergo substantially linear motion in the lateral direction. This motion may take place in the primary oscillation mode or in the secondary oscillation mode.

Figure 2B:
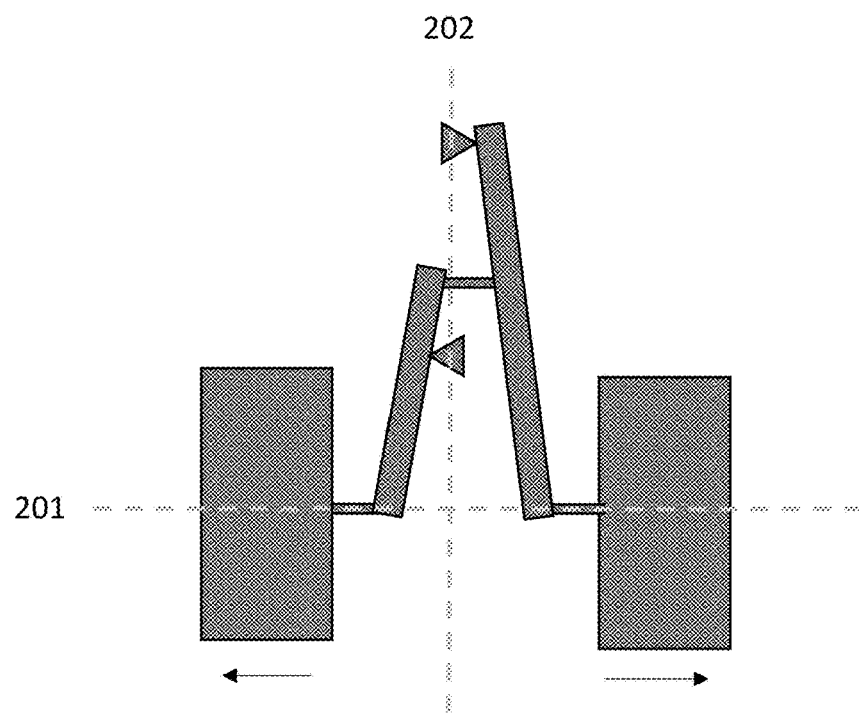
Figure 2C:
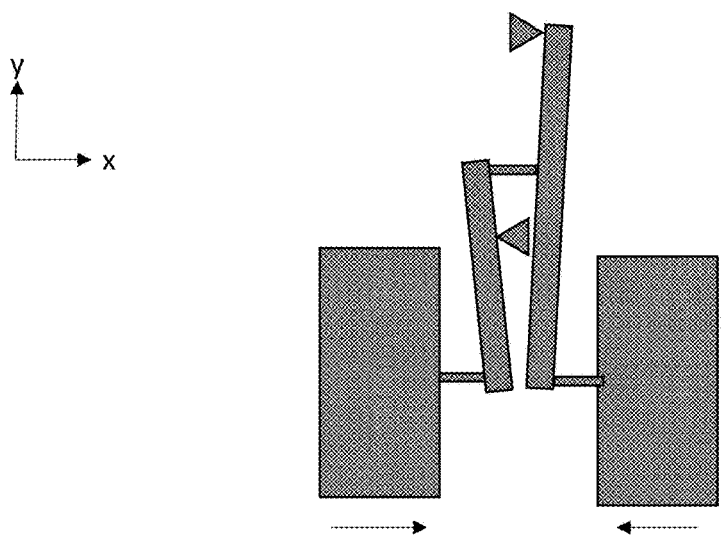

FIGS. 2b and 2c illustrate schematically the operation of the anti-phase coupling structure as the proof masses move away from each other and then back toward each other.

According to an exemplary aspect, the lateral anti-phase coupling structure 231 comprises a seesaw lever 241 and a force-displacement lever 271. The seesaw lever is suspended from first anchor point 261 by at least one flexible first suspender (not illustrated). The force-displacement lever 271 is suspended from a second anchor point 262 by at least one flexible second suspender (not illustrated). A joint 291 joins the seesaw lever 241 to the force-displacement lever 271 and transmits force in the lateral direction. Moreover, the joint may undergo bending when the levers rotate in the xy-plane.

A first mass connection element 251 joins the first proof mass 21 to the seesaw lever 241. The seesaw lever rotates in the device plane about the seesaw suspension point 281 where it is connected to the first anchor point 261. The first mass connection point 282 and the first joint connection point 283 are on opposite sides of the seesaw suspension point 281. Points 282 and 283 therefore always move in opposite directions when the seesaw lever is actuated by lateral movement in either proof mass.

A second mass connection element 252 joins the second proof mass 22 to the force-displacement lever 271. In operation, the force-displacement lever 271 rotates in the device plane about the force-displacement suspension point 286 where it is connected to the second anchor point 262. The second mass connection point 284 and the second joint connection point 285 lie on the same side of the force-displacement suspension point 286. Points 284 and 285 therefore always move in the same direction when the force-displacement lever is actuated by lateral movement in either proof mass.

Consequently, the purpose of the seesaw lever is to allow the anti-phase motion illustrated in FIGS. 2b and 2c, and to resist common mode motion where both masses would simultaneously move in the same lateral direction. The purpose of the force-displacement lever is to transmit force in both lateral directions between the seesaw lever 241 and the second proof mass 22. The force displacement lever also allows the second mass connection point 284 to be shifted in the transversal direction away from the second joint connection point 285.

This configuration, for example, facilitates arrangements like the one in FIG. 2a, where the first and second mass connection elements 251-252 have approximately the same coordinate in the transversal direction. These elements can, for example, be aligned on the lateral axis 201, as FIG. 2a illustrates. In other words, the coordinate of the first mass connection point on the transversal axis 202 (illustrated in FIG. 2b) may be substantially equal to the coordinate of the second mass connection point on the transversal axis 202. Furthermore, the centers of mass of the first and second proof masses, and/or the geometric center of these proof masses in the xy-plane, may also be aligned on the lateral axis 201.

However, in some applications the perfect alignment of both mass connections elements on the same lateral axis may not be possible or even desirable. The difference between the transversal coordinates of the first and second mass connection points may then for example be less than 1%, less than 5%, less than 10% or less than 20% of the transversal width of the first proof mass and/or the second proof mass.

In any case, when the first and second mass connection points have at least approximately the same transversal coordinate, the forces that are transmitted by the anti-phase coupling structure between the two proof masses also act on both proof masses on or close to the lateral axis. The centers of the two proof masses may in some cases also be aligned on the lateral axis, and the anti-phase coupling structure may then be configured so that no in-plane rotation or very little in-plane rotation is induced in the proof masses.

In this disclosure, the term "lever" refers to a device part that can typically rotate as a rigid body about an axis perpendicular to the xy-plane. In other words, when the device is operated and the proof masses oscillate, the levers will transmit force between the proof masses without bending significantly. However, even if the ideal lever is stiff, it may still be beneficial in some practical applications to make the lever so narrow that slight bending may occur in the lever during operation. The joints and mass connection elements that join the levers to each other and to the proof masses should nevertheless be significantly more flexible than the lever so that they can absorb the majority of the forces which act in the anti-phase coupling structure when the levers turn in the device plane.

Levers may have an elongated shape where their length in one dimension of the xy-plane (the y-direction in FIG. 2a) is substantially greater than their width in the other dimension of the xy-plane (the x-direction in FIG. 2a). The length/width aspect ratio may, for example, be greater than 2:1, greater than 3:1 or greater than 4:1. The elongated shape typically minimizes the area requirements of the anti-phase coupling arrangement. However, the lever could alternatively have a shape which is not elongated and where the length/width aspect ratio is less than 2:1. The lower the aspect ratio, the stiffer the lever.

According to an exemplary aspect, the microelectromechanical resonator can comprise one or more drive transducers (not illustrated) for setting the proof masses into oscillating motion. The device can also comprise one or more sense transducers for detecting oscillating motion of the proof masses. The drive and sense transducers can, for example, be capacitive transducers or piezoelectric transducers. The microelectromechanical resonator can, for example, be a gyroscope or any other kind of resonator where a coupling system between two masses should promote anti-phase movement and resist common-mode movement.

For purposes of this disclosure, the expression "aligned on the lateral axis" refers to the placement of proof masses so that the lateral axis crosses said Coriolis mass. The first and second proof masses may be symmetric in relation to the lateral axis and the lateral axis may cross the center of gravity of the first and second proof masses. However, symmetry is not necessary, that is, the anti-phase coupling structure can be utilized even if one or both of the proof masses are asymmetric with respect to the lateral axis.

In this disclosure, the term "suspender" refers to a spring which is placed (possibly together with other device parts) between a fixed part (such as an anchor point) and a mobile device part (such as a proof mass) which moves when the device is operated. A spring is a device part which is flexible in at least one direction. The term "coupling structure" refers to a part or combination of parts which connect one mobile proof mass to another. A coupling structure influences the movement of the proof masses to which it is coupled and also the resonance frequency at which the proof masses will oscillate in a given oscillation mode.

Coupling structures and flexible suspenders that provide the flexibility needed for accommodating the desired oscillation modes. The suspenders and the flexible parts of the coupling structure typically bend or twist when the suspended mobile masses are in motion.

A coupling structure may also be called a synchronization structure. For purposes of this disclosure, the term "synchronize", and phrases such as "structure A synchronizes oscillation mode X", have the following meaning. Structure A includes a mechanical connection in a system of interconnected mass elements that preferably oscillates in the desired mode X (for example anti-phase movement), but preferably not in an undesired mode Y (for example in-phase movement, where both masses move in the same direction). Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A can, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support.

The first and second proof masses can also be supported by other suspension and coupling structures than the anti-phase coupling structure. In general, all suspension, synchronization and coupling arrangements must be optimized for mechanical support, flexibility for movement in some directions and rigidity for movement in other directions. These three variables can conflict with each other, so optimization means finding a solution where each requirement is satisfied at least to a sufficient degree. All elements of the gyroscope may influence the optimization process.

According to an exemplary aspect, as shown in FIG. 2a, the first force-displacement suspension point 286 lies closer to the second joint connection point 285 than to the second mass connection point 284 on the first force-displacement lever 271.

Figure 3A:
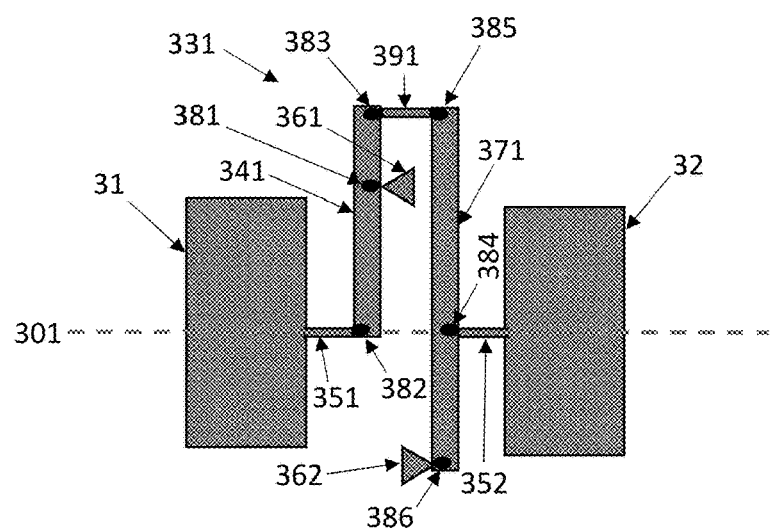
FIGS. 3a-3c also illustrates an anti-phase coupling structure with two levers according to an exemplary aspect.
Figure 3B:
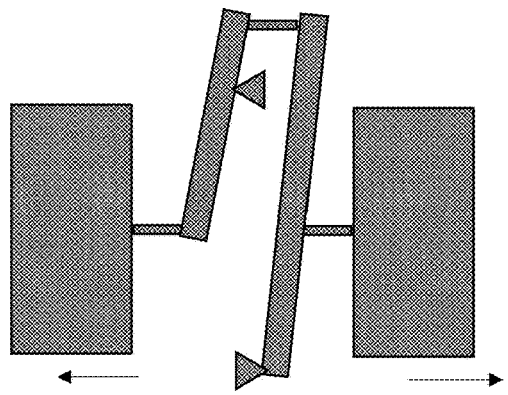
Figure 3C:
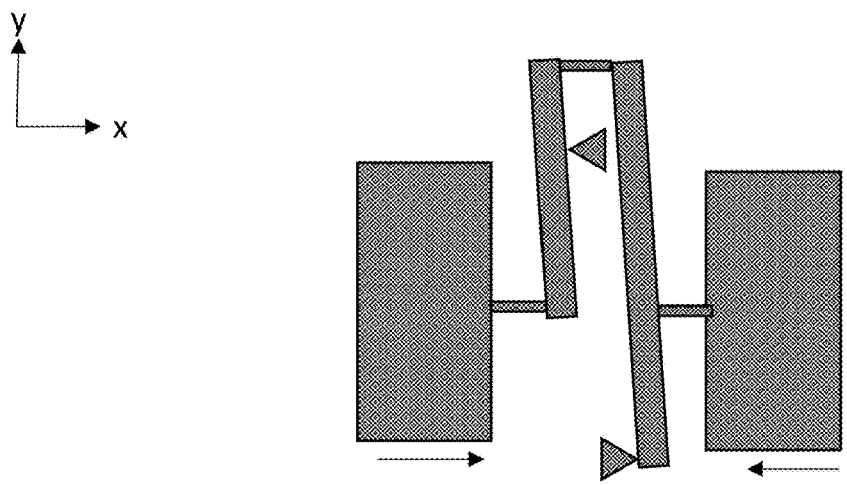

FIG. 3a illustrates an alternative option where reference numbers 301, 31, 32, 33, 341, 351-352, 361-362, 371, 381-386 and 391 correspond to reference numbers 201, 21, 22, 23, 241, 251-252, 261-262, 271, 281-286 and 291, respectively, in FIG. 2a as described above. The device in FIG. 3a differs from the one in FIG. 2a in that the first force-displacement suspension point 386 here lies closer to the second mass connection point 384 than to the second joint connection point 385 on the first force-displacement lever 371. FIGS. 3b and 3c illustrate the function of this anti-phase coupling structure when the first and second proof masses 31 and 32 move away from and towards each other.

As shown in FIG. 3a, the first force-displacement suspension point 386 lies closer to the second mass connection point 384 than to the second joint connection point 385 on the first force-displacement lever 371.

In the preceding FIGS. 2a and 3a, the system is illustrated in its rest position and both the seesaw lever and the force-displacement lever are oriented in the transversal direction (the y-direction). The levers then rotate to a different orientation when the proof masses move in relation to each other in FIGS. 2b-2c and 3b-3c.

It is noted that other figures of this disclosure also illustrate the levers in a transversal orientation in their rest position. However, in an alternative aspect, the configuration can be such to orient one or both of these levers in any non-transversal and non-lateral direction in its rest position. Furthermore, the seesaw lever and the force-displacement lever do not necessarily have to be parallel to each other in their rest positions. It is also noted that the same considerations apply to the joints and connectors discussed in this disclosure. They are illustrated as lateral in their rest positions, but they could alternatively oriented in a non-lateral direction. Furthermore, the joints and connectors may undergo significant bending when the anti-phase coupling structure operates. In summary, the anti-phase coupling structure can operate according to the same principle even if the levers are not parallel and not oriented in the transversal direction in their rest positions and even if the joints and connectors are not oriented in the lateral direction in their rest positions.

In all embodiments of this disclosure, the seesaw lever(s) and the force-displacement levers may be elongated beams for example with a length/width aspect ratio which is greater than 2, greater than 5 or greater than 10. Elongated shapes are typically advantageous because they minimize the space required by the anti-phase coupling structure in the xy-plane. However, beams with high length/width aspect ratios are also more flexible and therefore more prone to bending. The length of the seesaw lever may for example be in the range 100-500 µm. The length of the force-displacement lever may for example be in the range 100-500 µm. It should be appreciated that the optimal dimensions of the levers will depend on the magnitude of the forces which the anti-phase coupling structure is expected to transmit, the required displacement and the degree of bending which is considered acceptable.

In conclusion, the first seesaw lever and the first force-displacement lever can have an elongated shape, and these levers may be substantially parallel with each other when the first lateral anti-phase coupling structure is in its rest position. As a further option, the first seesaw lever and the first force-displacement lever may be oriented substantially in the transversal direction when the first lateral anti-phase coupling structure is in its rest position. But other shapes and other orientations are also possible.

In some applications, it is beneficial that the action of the anti-phase coupling structure displaces both masses symmetrically, i.e., by the same amount. In other words, when the first proof mass moves left by a distance D, the dimensions of the anti-phase coupling structure ensure that the second proof masses moves right by the same distance D, and vice versa when the masses move toward each other.

Figure 4:
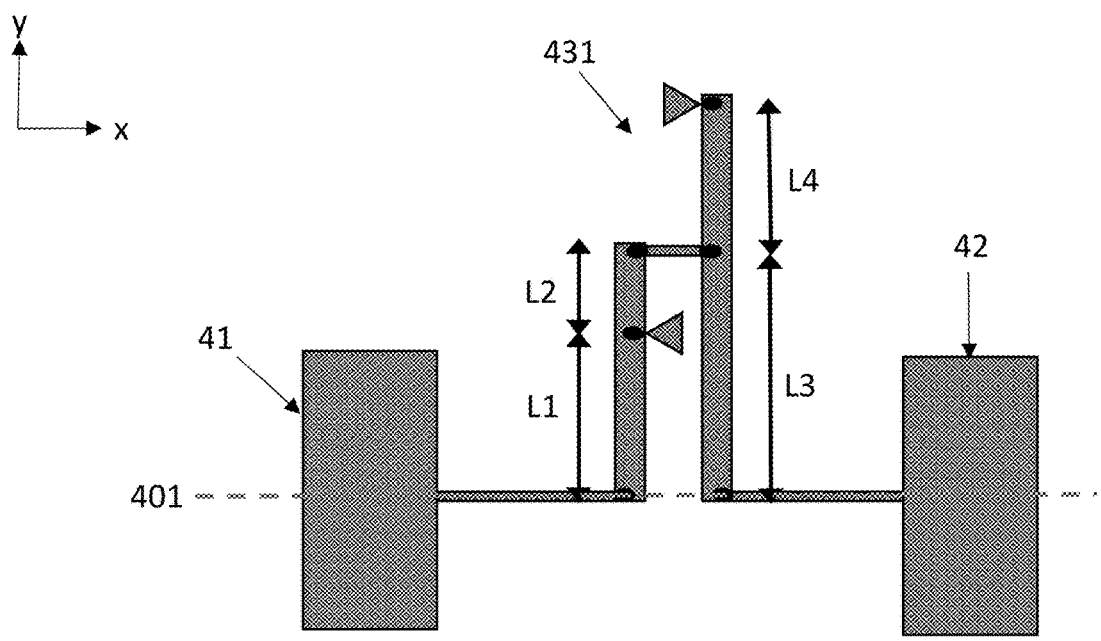
FIG. 4 illustrates distances between points located on the levers according to an exemplary aspect.

FIG. 4 illustrates a device which corresponds to FIG. 2a. Reference numbers 401, 41, 42 and 431 correspond to reference numbers 201, 21, 22 and 231, respectively, as described above. L1 is the transversal distance between the first mass connection point and the seesaw suspension point. L2 is the transversal distance between the seesaw suspension point and the first joint connection point. L3 is the transversal distance between the second mass connection point and the second joint connection point. L4 is the transversal distance between the second joint connection point and the force-displacement suspension point. It can be shown that the displacement is symmetric in the sense described above if (L2/L1)*(L3+L4)/L4=1.

This means that a theoretical ideal ratio between the lengths is L1:L3:(L3+L4)=1.0:1.5:3.0. However, it should be noted that due to finite elasticity of structures, the optimum dimensions in the real world may be slightly different from the theoretical ideal. For example, the levers are not ideally rigid and the suspensions from the anchor points have finite flexibility. These nonidealities may cause the force and displacement to differ from ideal antiphase movement which results in equal force but opposite force and displacement. Due to these inherent unidealities, the optimum design is usually reached through simulation, using for example finite element simulations. In the present case, an example of an optimized structure may for example be one where L1:L3:(L3+L4)=1.2:1.5:3.0, which is slightly different from the theoretical ideal. In general, changing the widths of the levers and the design of the anchor suspension may shift these optimum values.

Figure 5:
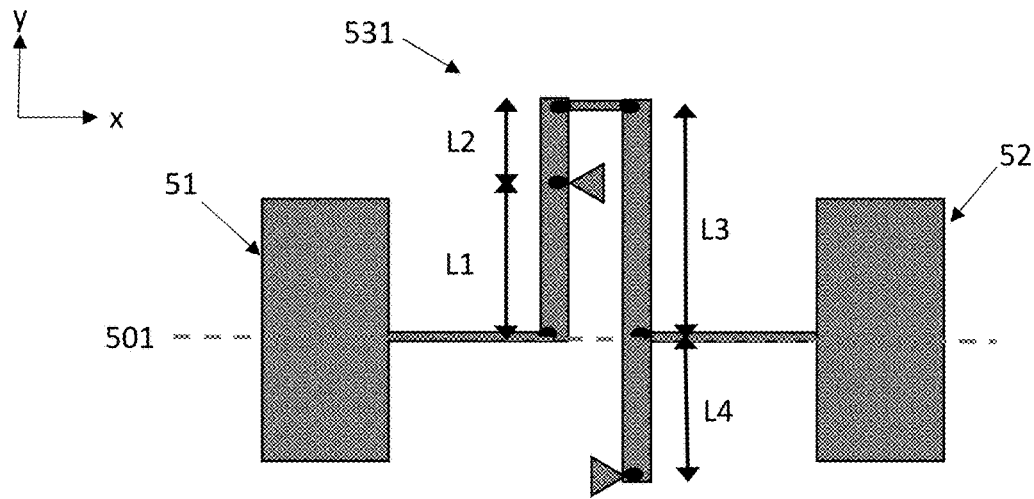
FIG. 5 also illustrates distances between points located on the levers according to an exemplary aspect.

FIG. 5 illustrates a device which corresponds to FIG. 3a. Reference numbers 501, 51, 52 and 531 correspond to reference numbers 301, 31, 32 and 331, respectively, as described above. L1, L2 and L3 are here defined in the same manner as in FIG. 4, but L4 is now the transversal distance between the force-displacement suspension point and the second mass connection point. It can be shown that the displacement is in this case again symmetric if (L2/L1)*(L3+L4)/L4=1. If the rest position of either lever is not transversal as in FIGS. 4 and 5, the length relationships needed for achieving symmetric displacement will be different.

It can be seen in all figures of this disclosure that the first seesaw suspension point is closer to the first joint connection point than to the first mass connection point (L1>L2). When the seesaw lever moves, the displacement of the first mass connection point in the x-direction will therefore be greater than the displacement of the first joint connection point in the x-direction. On the other hand, L3>L4, and the force-displacement lever can either make the displacement of the second mass connection point in the x-direction greater (FIGS. 2b, 2c and 4) or smaller (FIGS. 3b, 3c and 5) than the displacement of the second joint connection point in the x-direction.

It is noted that in all exemplary embodiments of this disclosure, the first and second proof masses may be of equal size. Alternatively, the first and second proof masses be of unequal size in alterative aspects. Whether or not their size is equal, the displacement of the proof masses may be different, so that the distance by which the first proof mass moves is not equal to the distance by which the second proof mass moves. The displacement may alternatively be equal on the two sides, as described above.

Although the action of the anti-phase coupling structure illustrated in FIGS. 2b-2c and 3b-3c ideally generates force only in the lateral direction, the joint and the mass connection element may in practice bend to some extent when the coupling structure operates. This bending may impart a torque on the proof masses which could induce some in-plane rotation in the proof masses. This effect can be avoided by using two anti-phase coupling structures next to each other.

Figure 6A:
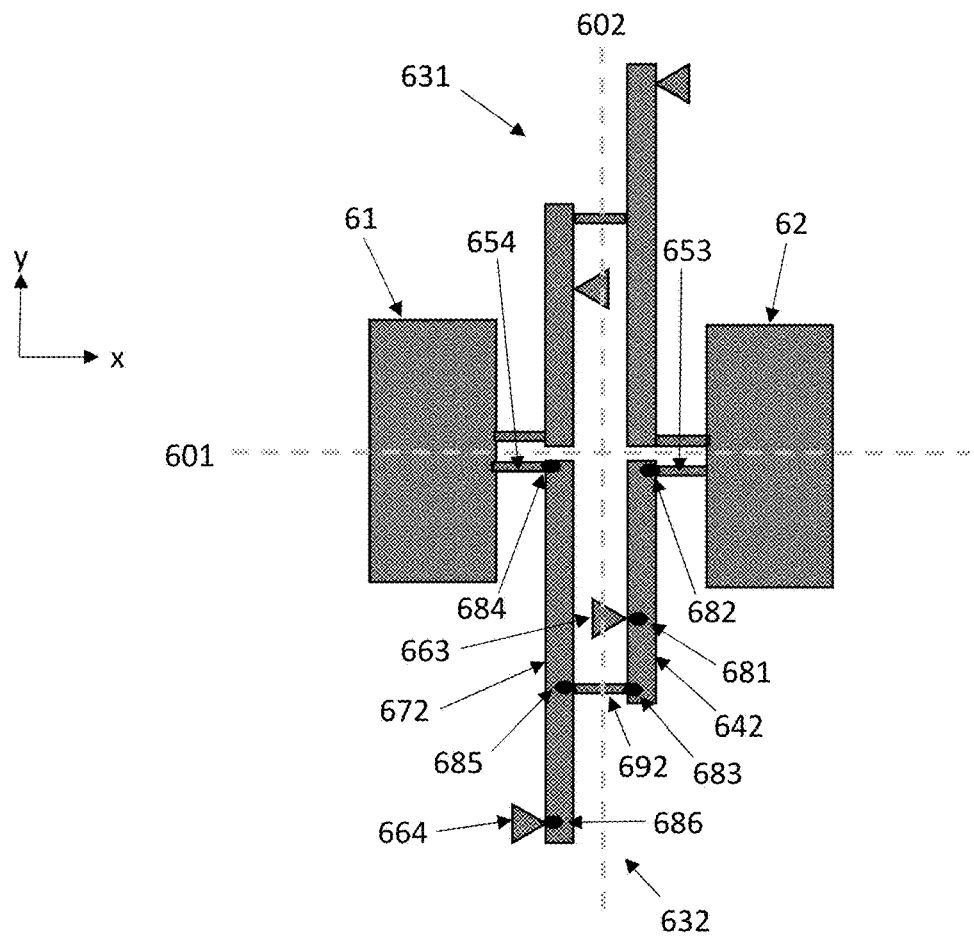
FIGS. 6a-6c illustrate two anti-phase coupling structures coupled to a proof mass pair according to an exemplary aspect.
Figure 6B:
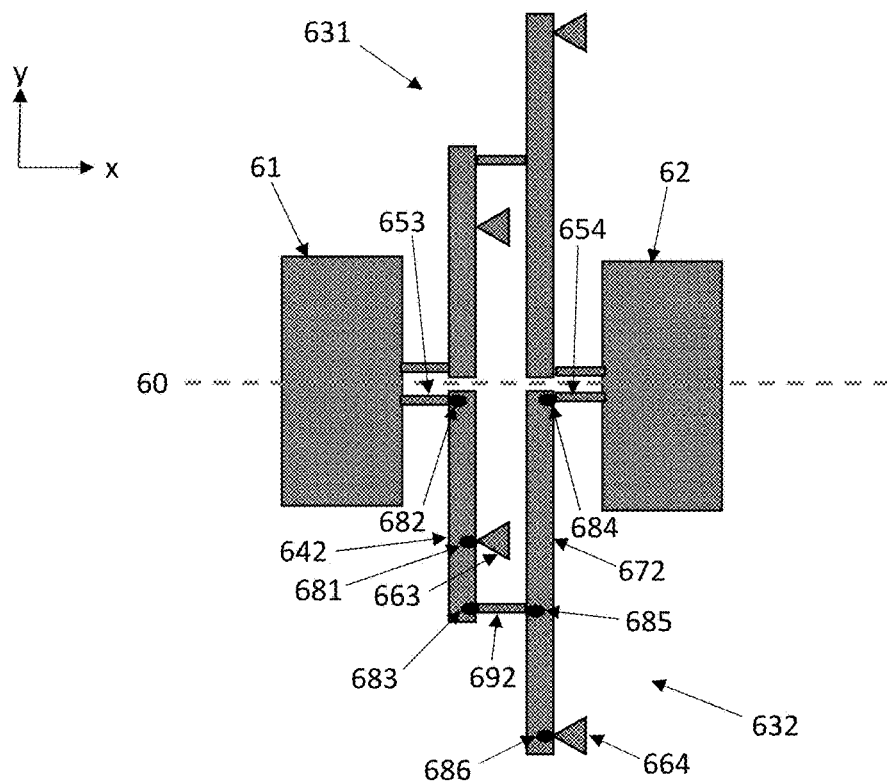
Figure 6C:
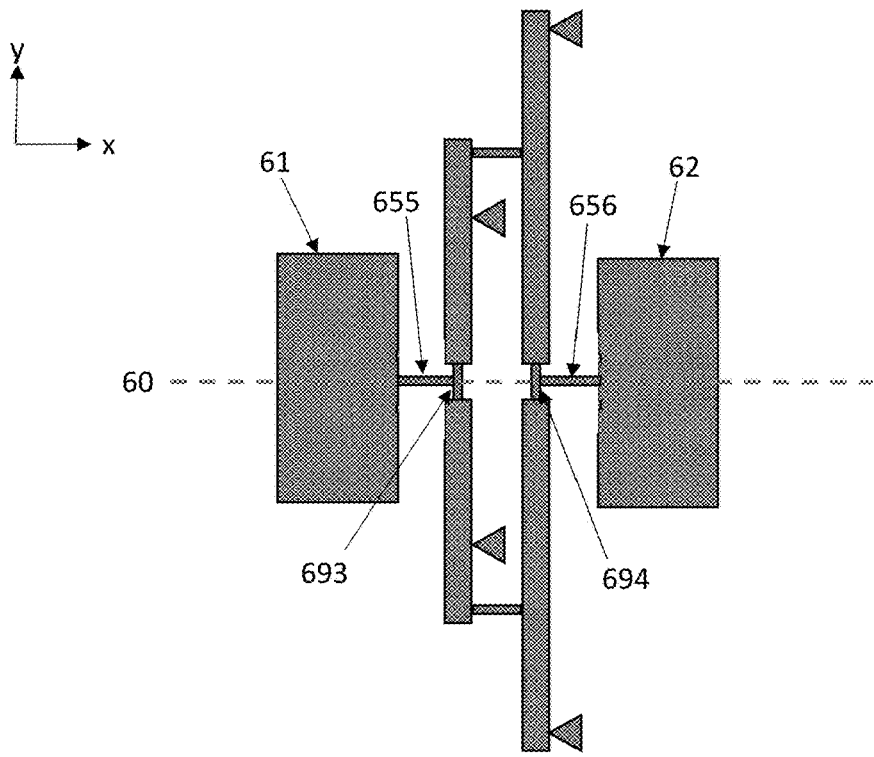

FIGS. 6a-6c illustrate how two anti-phase coupling structures can be implemented in an exemplary aspect. In particular, reference numbers 601, 602, 61, 62 and 631 correspond to reference numbers 201, 202, 21, 22 and 231, respectively, in FIG. 2a as described above. It is noted that all elements of the first anti-phase coupling structure 631 have not been marked in FIG. 6a, but they correspond to the elements discussed above with reference to FIG. 2a.

In addition to the element of the first anti-phase coupling structure 631, the first proof mass 61 is in FIG. 6a coupled to the second proof mass 62 by a second lateral anti-phase coupling structure 632. The second lateral anti-phase coupling structure 632 may comprise a second seesaw lever 642 and a second force-displacement lever 672 (the first seesaw lever and first force-displacement lever are in the first anti-phase coupling structure). A second joint 692 may extend from a third joint connection point 683 on the second seesaw lever 642 to a fourth joint connection point 685 on the second force-displacement lever 672.

There are two exemplary configurations in this aspect. In the first configuration (illustrated in FIG. 6b) a third mass connection element 653 extends from the first proof mass 61 to a third mass connection point 682 on the second seesaw lever 642, and a fourth mass connection element 654 extends from the second proof mass 62 to a fourth mass connection point 684 on the second force-displacement lever 672.

In the second configuration (illustrated in FIG. 6a) a third mass connection element 653 extends from the second proof mass 62 to a third mass connection point 682 on the second seesaw lever 642, and a fourth mass connection element 654 extends from the first proof mass 61 to a fourth mass connection point 684 on the second force-displacement lever 672.

Moreover, the second seesaw lever 642 can be suspended from a third anchor point 663 by at least one flexible third suspender (not illustrated) attached to the second seesaw lever 642 at a second seesaw suspension point 681. The at least one flexible third suspender allows the second seesaw lever 642 to turn around the second seesaw suspension point 681 in the xy-plane. The second seesaw suspension point 681 lies between the third joint connection point 683 and the third mass connection point 682 on the second seesaw lever 642.

In addition, the second force-displacement lever 672 can be suspended from a fourth anchor point 664 by at least one flexible fourth suspender (not illustrated) attached to the second force-displacement lever 672 at a second force-displacement suspension point 686. The at least one flexible fourth suspender may allow the second force-displacement lever 672 to turn around the second force-displacement suspension point 686 in the xy-plane. Both the fourth joint connection point 685 and fourth mass connection point 684 may lie on the same side of the second force-displacement suspension point 686 on the second force-displacement lever 672.

In other words, the first and second anti-phase coupling structures can either by arranged substantially symmetrically with respect to the lateral axis 601 (as in FIG. 6b) or substantially reflection-symmetrically with respect to a center point where the lateral axis 601 crosses the transversal axis 602 (as in FIG. 6a). The optimal arrangement can depend on many different design constraints.

The action of the second anti-phase coupling structure is based on the same principles as the previously described action of the first anti-phase coupling structure. The options described above with reference to the coordinates of the mass connection points on the transversal axis and the shape and orientation of the levers in the rest position of the anti-phase coupling structure all apply to the corresponding parts of the second anti-phase coupling structure as well, mutatis mutandis.

The transversal distance between the two mass connection elements that are connected to the same proof mass in FIGS. 6a and 6b may for example be less than 1%, less than 5%, less than 10% or less than 20% of the transversal width of the first proof mass and/or the second proof mass.

A further option is illustrated in FIG. 6c in which the adjacent mass connection elements may be united so that only one mass connection element 655/656 extends from each proof mass to the two anti-phase coupling structures. In other words, the first and fourth mass connection elements may be the same mass connection element and the second and third mass connection elements may be the same mass connection element in FIG. 6a, or the first and third mass connection elements may be the same mass connection element and the second and fourth mass connection elements may be the same mass connection element in FIG. 6b. Additional transversal lever connection elements 693 and 694 extend between the two levers on the left and the levers on the right in FIG. 6c, and the mass connection elements 655-656 are attached to these transversal lever connection elements 693-694.

Figure 7A:
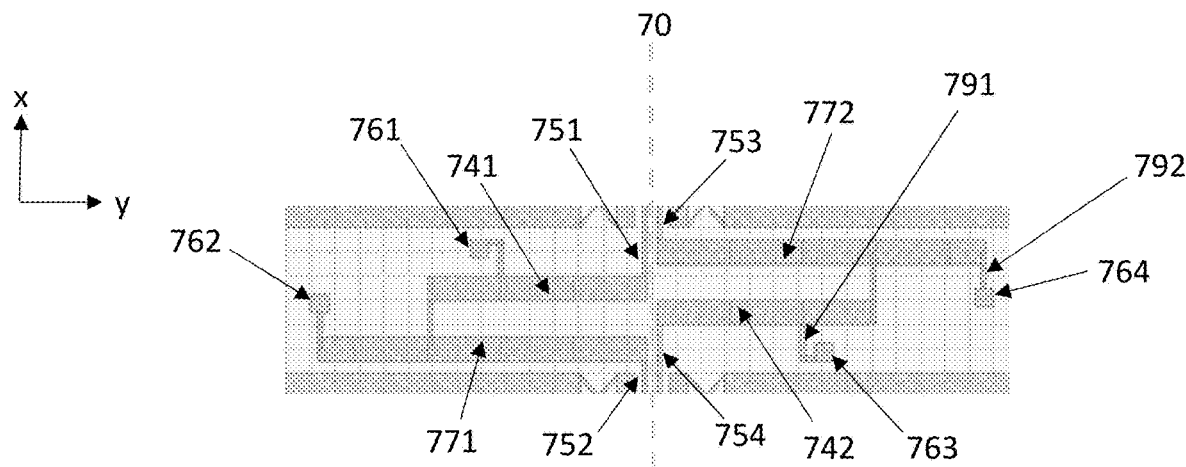
FIGS. 7a-7b illustrate how anti-phase coupling structures move when the masses move according to an exemplary aspect.

FIG. 7a illustrates a more realistic implementation of two anti-phase coupling structures next to each other. reference numbers 70, 741, 751-752, 761-762 and 771 correspond to reference numbers 20, 241, 251-252, 261-262 and 271, respectively, in FIG. 2a as described above. Reference numbers 742, 753-754, 763-764 and 772 correspond to reference numbers 642, 653-654, 663-664 and 672, respectively, in FIG. 6a as also described above. FIG. 7a also illustrate first suspenders such as 791, which suspend the seesaw levers from the corresponding anchor points, and second suspenders such as 792 which suspend the force-displacement levers from the corresponding anchor points.

Figure 7B:
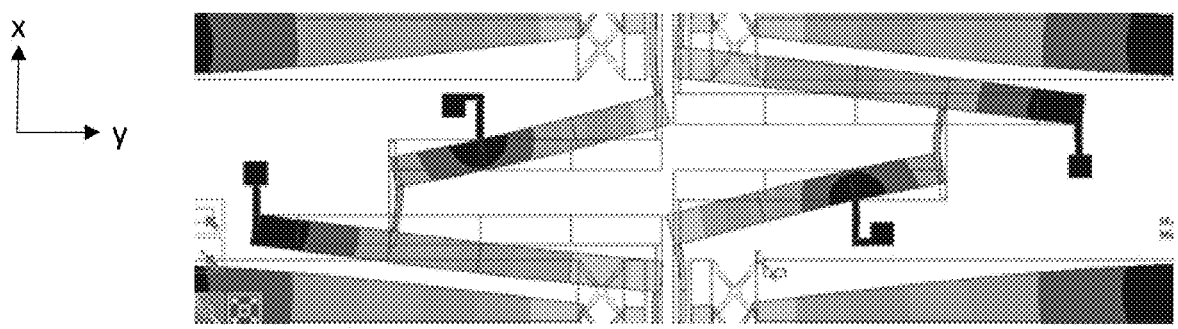

FIG. 7b illustrates the anti-phase coupling structures when the proof masses have moved apart from each other. It can be seen that the joints and mass connection elements flexibly absorb the twisting forces that arise from the turning of the levers in opposite directions. Slight bending may occur also in the levers themselves and in the suspenders.

In general, it is noted that the above description of exemplary embodiments is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed:

1. A microelectromechanical resonator comprising:
a first proof mass and a second proof mass that lie in an xy-plane, such that the first proof mass and the second proof mass are aligned on a lateral axis extending in a lateral direction in the xy-plane, and a transversal axis extends in a transversal direction that is perpendicular to the lateral direction; and
a first lateral anti-phase coupling structure that couples the first proof mass to the second proof mass and includes:
a first seesaw lever and a first force-displacement lever,
a first joint that extends from a first joint connection point on the first seesaw lever to a second joint connection point on the first force-displacement lever,
a first mass connection element that extends from the first proof mass to a first mass connection point on the first seesaw lever, and
a second mass connection element that extends from the second proof mass to a second mass connection point on the first force-displacement lever,
wherein the first seesaw lever is suspended from a first anchor point by at least one flexible first suspender attached to the first seesaw lever at a first seesaw suspension point, and the at least one flexible first suspender configures the first seesaw lever to turn around the first seesaw suspension point in the xy-plane,
wherein the first seesaw suspension point lies between the first joint connection point and the first mass connection point on the first seesaw lever, and
wherein the first seesaw suspension point lies closer to the first joint connection point than to the first mass connection point, and
the first force-displacement lever is suspended from a second anchor point by at least one flexible second suspender attached to the first force-displacement lever at a first force-displacement suspension point, and the at least one flexible second suspender configures the first force-displacement lever to turn around the first force-displacement suspension point in the xy-plane, and
both the second joint connection point and second mass connection point lie on a same side of the first force-displacement suspension point on the first force-displacement lever.

2. The microelectromechanical resonator according to claim 1, wherein a coordinate of the first mass connection point on the transversal axis is substantially equal to the coordinate of the second mass connection point on the transversal axis.

3. The microelectromechanical resonator according to claim 1, wherein the first force-displacement suspension point lies closer to the second joint connection point than to the second mass connection point on the first force-displacement lever.

4. The microelectromechanical resonator according to claim 3, wherein the first proof mass is further coupled to the second proof mass by a second lateral anti-phase coupling structure that includes a second seesaw lever and a second force-displacement lever, with a second joint extending from a third joint connection point on the second seesaw lever to a fourth joint connection point on the second force-displacement lever.

5. The microelectromechanical resonator according to claim 4, wherein a third mass connection element extends from the first proof mass to a third mass connection point on the second seesaw lever, and a fourth mass connection element extends from the second proof mass to a fourth mass connection point on the second force-displacement lever.

6. The microelectromechanical resonator according to claim 5, wherein the second seesaw lever is suspended from a third anchor point by at least one flexible third suspender attached to the second seesaw lever at a second seesaw suspension point, the at least one flexible third suspender configures the second seesaw lever to turn around the second seesaw suspension point in the xy-plane, and the second seesaw suspension point lies between the third joint connection point and the third mass connection point on the second seesaw lever.

7. The microelectromechanical resonator according to claim 6, wherein the second force-displacement lever is suspended from a fourth anchor point by at least one flexible fourth suspender attached to the second force-displacement lever at a second force-displacement suspension point, the at least one flexible fourth suspender configures the second force-displacement lever to turn around the second force-displacement suspension point in the xy-plane, and both the fourth joint connection point and fourth mass connection point lie on a same side of the second force-displacement suspension point on the second force-displacement lever.

8. The microelectromechanical resonator according to claim 4, wherein a third mass connection element extends from the second proof mass to a third mass connection point on the second seesaw lever, and a fourth mass connection element extends from the first proof mass to a fourth mass connection point on the second force-displacement lever.

9. The microelectromechanical resonator according to claim 8, wherein the second seesaw lever is suspended from a third anchor point by at least one flexible third suspender attached to the second seesaw lever at a second seesaw suspension point, the at least one flexible third suspender configures the second seesaw lever to turn around the second seesaw suspension point in the xy-plane, and the second seesaw suspension point lies between the third joint connection point and the third mass connection point on the second seesaw lever.

10. The microelectromechanical resonator according to claim 9, wherein the second force-displacement lever is suspended from a fourth anchor point by at least one flexible fourth suspender attached to the second force-displacement lever at a second force-displacement suspension point, the at least one flexible fourth suspender configures the second force-displacement lever to turn around the second force-displacement suspension point in the xy-plane, and both the fourth joint connection point and fourth mass connection point lie on a same side of the second force-displacement suspension point on the second force-displacement lever.

11. The microelectromechanical resonator according to claim 1, wherein the first force-displacement suspension point lies closer to the second mass connection point than to the second joint connection point on the first force-displacement lever.

12. The microelectromechanical resonator according to claim 1, wherein the first seesaw lever and the first force-displacement lever both have an elongated shape.

13. The microelectromechanical resonator according to claim 12, wherein the first seesaw lever and the first force-displacement lever are substantially parallel with each other when the first lateral anti-phase coupling structure is in a rest position.

14. The microelectromechanical resonator according to claim 13, wherein the first seesaw lever and the first force-displacement lever are oriented substantially in the transversal direction when the first lateral anti-phase coupling structure is in the rest position.

15. A microelectromechanical resonator comprising:
a first proof mass and a second proof mass that are aligned on a lateral axis extending in a lateral direction, with a transversal axis extending in a transversal direction that is perpendicular to the lateral direction; and
a first lateral anti-phase coupling structure that couples the first proof mass to the second proof mass and includes:
a first seesaw lever and a first force-displacement lever,
a first joint that extends from a first joint connection point on the first seesaw lever to a second joint connection point on the first force-displacement lever,
a first mass connection element that extends from the first proof mass to a first mass connection point on the first seesaw lever, and
a second mass connection element that extends from the second proof mass to a second mass connection point on the first force-displacement lever,
wherein the first seesaw lever is suspended from a first anchor point by at least one first suspender that is attached to the first seesaw lever at a first seesaw suspension point that is disposed between the first joint connection point and the first mass connection point on the first seesaw lever and closer to the first joint connection point than to the first mass connection point, and
wherein the at least one first suspender configures the first seesaw lever to turn around the first seesaw suspension point,
wherein the first force-displacement lever is suspended from a second anchor point by at least one second suspender attached to the first force-displacement lever at a first force-displacement suspension point, and at least one flexible second suspender configures the first force-displacement lever to turn around the first force-displacement suspension point, and
both the second joint connection point and second mass connection point lie on a same side.

* * * * *